US008707262B2

(12) United States Patent
Eska et al.

(10) Patent No.: US 8,707,262 B2
(45) Date of Patent: Apr. 22, 2014

(54) CODE SCORING

(75) Inventors: Veit Eska, Malsch (DE); Oliver Kapaun, Bad Soden (DE)

(73) Assignee: SAP AG, Walldorf (DE)

( * ) Notice: Subject to any disclaimer, the term of this patent is extended or adjusted under 35 U.S.C. 154(b) by 62 days.

(21) Appl. No.: 13/335,877

(22) Filed: Dec. 22, 2011

(65) Prior Publication Data
US 2013/0167114 A1 Jun. 27, 2013

(51) Int. Cl.
*G06F 9/44* (2006.01)

(52) U.S. Cl.
USPC .......................................... 717/123; 717/120

(58) Field of Classification Search
None
See application file for complete search history.

(56) References Cited

U.S. PATENT DOCUMENTS

| | | | | |
|---|---|---|---|---|
| 5,313,387 | A * | 5/1994 | McKeeman et al. | 700/90 |
| 6,226,792 | B1 * | 5/2001 | Goiffon et al. | 717/120 |
| 6,964,042 | B2 * | 11/2005 | Lagergren | 717/153 |
| 7,103,580 | B1 * | 9/2006 | Batachia et al. | 705/80 |
| 7,490,319 | B2 * | 2/2009 | Blackwell et al. | 717/124 |
| 7,610,580 | B2 * | 10/2009 | Lagergren | 717/153 |
| 7,797,684 | B2 * | 9/2010 | Prakash | 717/127 |
| 8,359,317 | B2 * | 1/2013 | Zhang et al. | 707/741 |
| 2003/0033590 | A1 * | 2/2003 | Leherbauer | 717/122 |
| 2004/0117779 | A1 * | 6/2004 | Lagergren | 717/153 |
| 2004/0172389 | A1 * | 9/2004 | Galai et al. | 707/3 |
| 2005/0246699 | A1 * | 11/2005 | Lagergren | 717/153 |
| 2006/0294158 | A1 * | 12/2006 | Tsyganskiy et al. | 707/202 |
| 2007/0168946 | A1 * | 7/2007 | Drissi et al. | 717/110 |
| 2008/0114628 | A1 * | 5/2008 | Johnson et al. | 705/7 |
| 2009/0106736 | A1 * | 4/2009 | Brewis et al. | 717/123 |
| 2010/0058284 | A1 * | 3/2010 | Swaminathan et al. | 717/101 |
| 2010/0169375 | A1 * | 7/2010 | Cumby et al. | 707/780 |
| 2010/0185963 | A1 * | 7/2010 | Slik et al. | 715/764 |
| 2010/0268558 | A1 * | 10/2010 | Behmoiras et al. | 705/7 |
| 2012/0185827 | A1 * | 7/2012 | Eska et al. | 717/121 |
| 2012/0317209 | A1 * | 12/2012 | Briggs | 709/206 |
| 2013/0055235 | A1 * | 2/2013 | Eska et al. | 717/173 |
| 2013/0167114 | A1 * | 6/2013 | Eska et al. | 717/120 |

OTHER PUBLICATIONS

Bonaccorsi et al., "Comparing Motivations of Individuals and Firms to Take Part in the Open Source Movement. From Community to Business", 2004, retrieved from <http://www2.druid.dk/conferences/viewpaper.php?id=2302&cf=16> total pp. 32.*

* cited by examiner

*Primary Examiner* — Don Wong
*Assistant Examiner* — Marina Lee
(74) *Attorney, Agent, or Firm* — Mintz Levin Cohn Ferris Glovsky and Popeo, P.C.

(57) ABSTRACT

Methods and apparatus, including computer program products, are provided for code scoring. In one aspect, there is provided a computer-implemented method. The method may include receiving metadata including information representative of at least one custom code module used in a business system; receiving at least one rule from a rules template; and calculating, based on the received metadata and the received at least one rule, a score representative of whether the at least one custom code module is maintained. Related apparatus, systems, methods, and articles are also described.

16 Claims, 10 Drawing Sheets

CODE SCORING

FIELD

The present disclosure generally relates to data processing and, in particular, scoring code.

BACKGROUND

A business system, such as enterprise resource planning system and other complex business application software, may include a plurality of modules (also referred to as applets, components, portions of code, and systems) which when executed by a computer provides the function(s) of the business system. As business systems become more open and flexible, some of the modules may be developed by the original software maker of the business system but other modules may be developed by the end-user, developers, and other entities. Regardless of whether the owner or licensee has formally agreed to adopt these other modules, these other modules represent custom code sets that are part of the business system.

SUMMARY

In one aspect there is provided a method. The method may include receiving metadata including information representative of at least one custom code module used in a business system; receiving at least one rule from a rules template; and calculating, based on the received metadata and the received at least one rule, a score representative of whether the at least one custom code module is maintained.

In some implementations, the above-noted aspects may further include additional features described herein including one or more of the following. A reporter module may query a custom code library to obtain the metadata describing the at least one custom code module. The calculating may be performed by a score calculator module. A custom code library may be queried to obtain the metadata including information representative of a location of the at least one custom code module, an ownership of the at least one custom code module in the business system, and integration information for the at least one custom code module. The at least one rule may define a function for determining the score based on the received metadata. A first score may be calculated based on the received metadata representative of the at least one custom code module lacking a first owner, and a second score may be calculated based on the received metadata representative of the at least one custom code module having a second owner, wherein the second score indicates a greater degree of maintenance than the second score. The maintenance may represent a degree of integration of the at least one custom code module into a lifecycle maintenance program of the business system. A score calculator module may provide to a user interface the calculated score.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

Like labels are used to refer to same or similar items in the drawings.

DETAILED DESCRIPTION

As business systems gain importance within a business, custom code has become increasingly common. For example, a business system may be deployed with a delivered code set, and additional custom code may be developed in addition to the standard delivered code. However, this custom code may present a challenge to a business. For example, custom code may not be supported, and, as such, represent a risk with respect to the lifecycle maintenance of the business system as maintenance and support may not be covered by a software lifecycle maintenance support contract or program. More troubling is that many businesses are often unaware of the degree to which they are using custom code or the exposure they face. Custom code for a business system may be managed based on key performance indicators, which may be financial measurements and/or non-financial measurements. In any case, these key performance indicators may be used to score the custom code, providing a so-called "custom code score."

In some implementations, the key performance indicators used to score the custom code may be directed to transparency and/or awareness of the existence of custom code in a business system. For example, a business system in which there is little awareness of what objects are custom code or where the custom code is being used would likely have custom code that is not part of the lifecycle maintenance and support of the business system. The key performance indicators used to score the custom code may also be directed to whether the custom code is owned and/or controlled by the business operating the business system. For example, custom code not controlled and/or not owned (or under a contract, license, maintenance program, and the like) would likely not be part of the lifecycle maintenance and support of the business system. In addition, the key performance indicators used to score the custom code may also represent the extent to which the custom code is integrated in the life cycle management process of the business system. For example, code that is part of the business system's existing life cycle management is more likely to be maintained.

Figure 1:
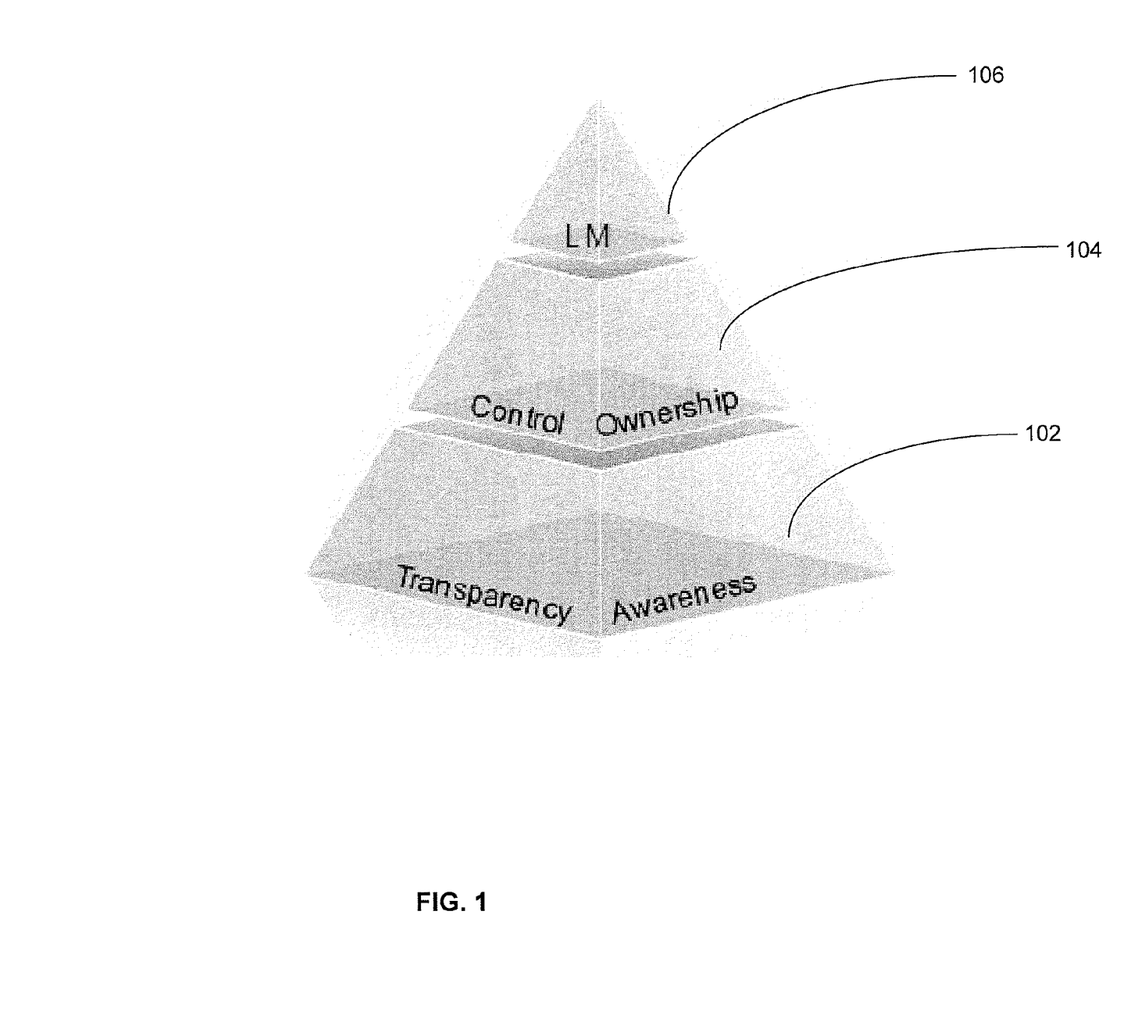
FIG. 1 depicts a hierarchy of levels representative of the general categories of key performance indicators used to score custom code.

FIG. 1 depicts a hierarchy of levels representative of the general categories of key performance indicators used to score custom code. FIG. 1 depicts a transparency and awareness level 102, an ownership and control level 104, and a lifecycle management level 106. For example, a custom code score may be generated as a weighted combination of values representative of each of these levels. In some implementations, a higher custom code score may be given to a business system that is aware of the location of all of its custom code, owns (or has under contract) all of its custom code, and has integrated all of its custom code into the business' software lifecycle maintenance program. On the other hand, a lower custom code score may be given to a business system that is unaware of the location of all of its custom code, does not own (or has under contract) one or more, if not all, of its custom code, and/or has not integrated one or more, if not all; of its custom code into the business' software lifecycle maintenance program.

Figure 2:
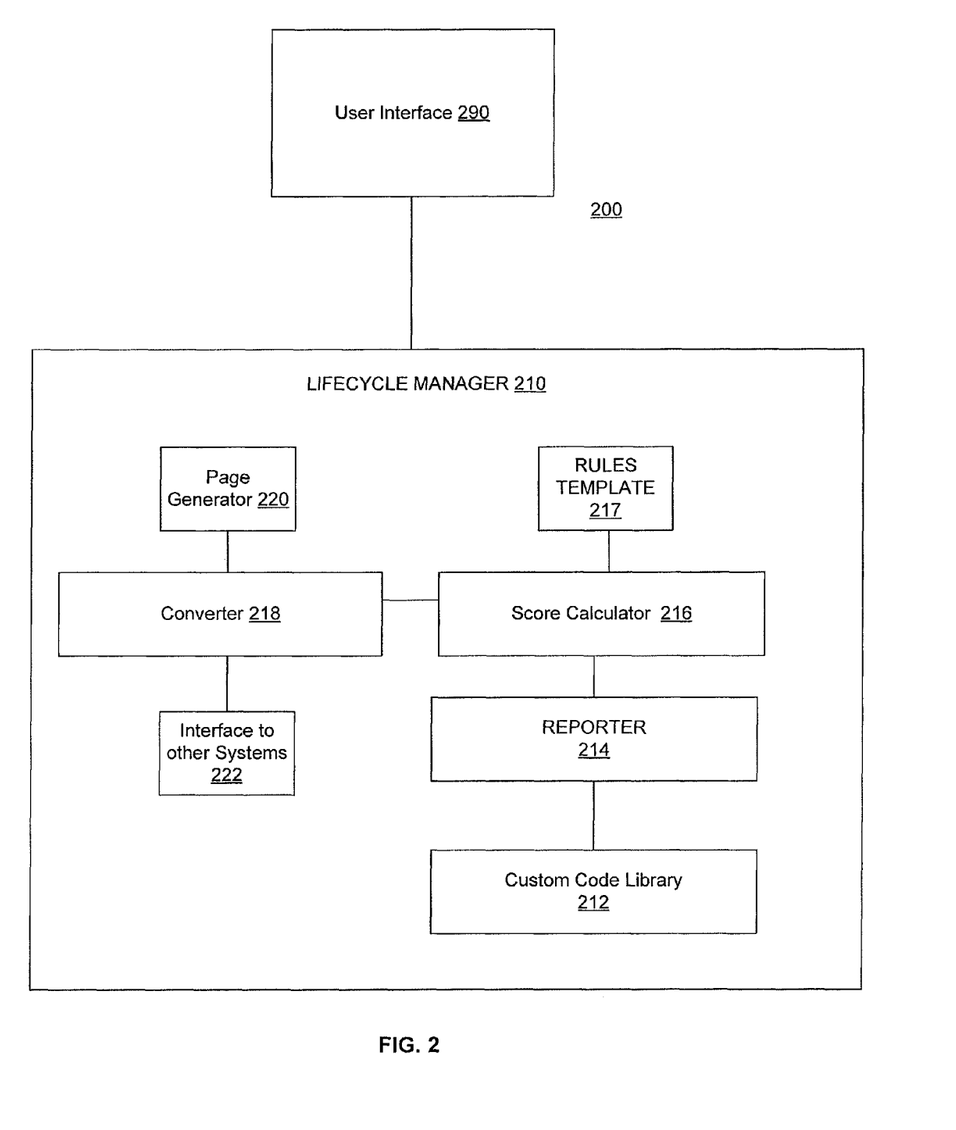
FIG. 2 depicts an example system for code scoring.

FIG. 2 depicts a system 200 for scoring code, such as custom code used in a business system. System 200 includes a user interface 290 coupled to a lifecycle manager 210 for managing the business system including the custom code and data of the business system.

The lifecycle manager 210 may further include a custom code library 212 coupled to a reporter 214 for accessing the custom code library 212. The reporter 214 may be further coupled to a score calculator 216 for calculating custom code scores based on a rules template 217. A converter 218 may convert information provided by the score calculator 216 and/or reporter 214 into a format that can be generated into a page at page generator 220 for presentation at user interface 290 or sent via interface 222 to another system, such as a business system being managed by lifecycle manager 210.

The custom code library 212 may include metadata describing custom code used in a business system being managed by lifecycle manager 210. The custom code library 212 may store, in some implementations, the metadata in a database, which can be queried by reporter 214 using commands (e.g., SQL statements). The metadata may include any information describing the one or more objects, which comprise the business system being managed by lifecycle manager 210. For example, the business system being managed may include a plurality of standard objects (e.g., code objects, code modules, and the like) delivered by the vendor (or software maker) of the business system and a plurality of custom objects which were not delivered by the vendor (or software maker) of the business system as part of the standard configuration.

In some implementations, custom code may refer to coding which is not provided by a software vendor (also referred to herein as a software maker) or not created by the software vendor's program (e.g., in case of computer generated code). Custom code may also include table changes that result in a customization change to a business system being managed by lifecycle manager 210. Custom code may also include unsupported or third party modifications/enhancements made to existing code provided by a software vendor. In any case, the business system may include a plurality of custom code objects and a plurality of standard objects, which when executed by at least one processor provides the business system. Examples of metadata stored at custom code library 212 are described further below with respect to FIG. 4.

The reporter 214 may be configured to access custom code library 212, query custom code library 212 for metadata describing the custom code (e.g., customs code objects), and provide, in response to the query, the metadata to score calculator 216. In some implementations, the reporter 214 may obtain information about the custom code by querying the custom code library 212 using SQL, although other query languages may be used as well.

The score calculator 216 may receive from reporter 214 metadata describing the custom code. The score calculator 216 may also determine a score for the custom code based on rules template 217. For example, the score calculator 216 may determine a custom code score based on the metadata (which may describe key performance information related to the hierarchy described with respect to FIG. 1) and the rules obtained from rules template 217. And, the rules may define how to generate a score from the metadata. The score calculator 216 may then provide the score, which is representative of how well the custom code is incorporated into the lifecycle maintenance program of the business system being managed. The score may be provided as a numerical score, an alphanumeric score, a binary score indicating the degree of incorporation into the lifecycle maintenance program custom code, and in any other form representative of how well the custom code is incorporated into the lifecycle maintenance program of the business system being managed.

To illustrate by way of an example, the score calculator 216 may receive metadata describing the awareness of the existence or the location of custom code in a business system, the ownership of the custom code in the business system, and the degree of integration of the custom code custom into the software lifecycle maintenance program of the business system. The rules from the rules template 217 may define how to process (e.g., quantify, combine, weight, scale, calculate, and the like) this metadata (or key performance indicators) into a custom code score. Examples of scores are provided below with respect to FIG. 5. The custom code score may score how well custom code is being managed and the custom code scores may be calculated over time to detect trends, managing thus custom code lifecycle management improvement programs. For example, an initial score may be used as a benchmark from which improvements (or lack thereof).

Figure 3:
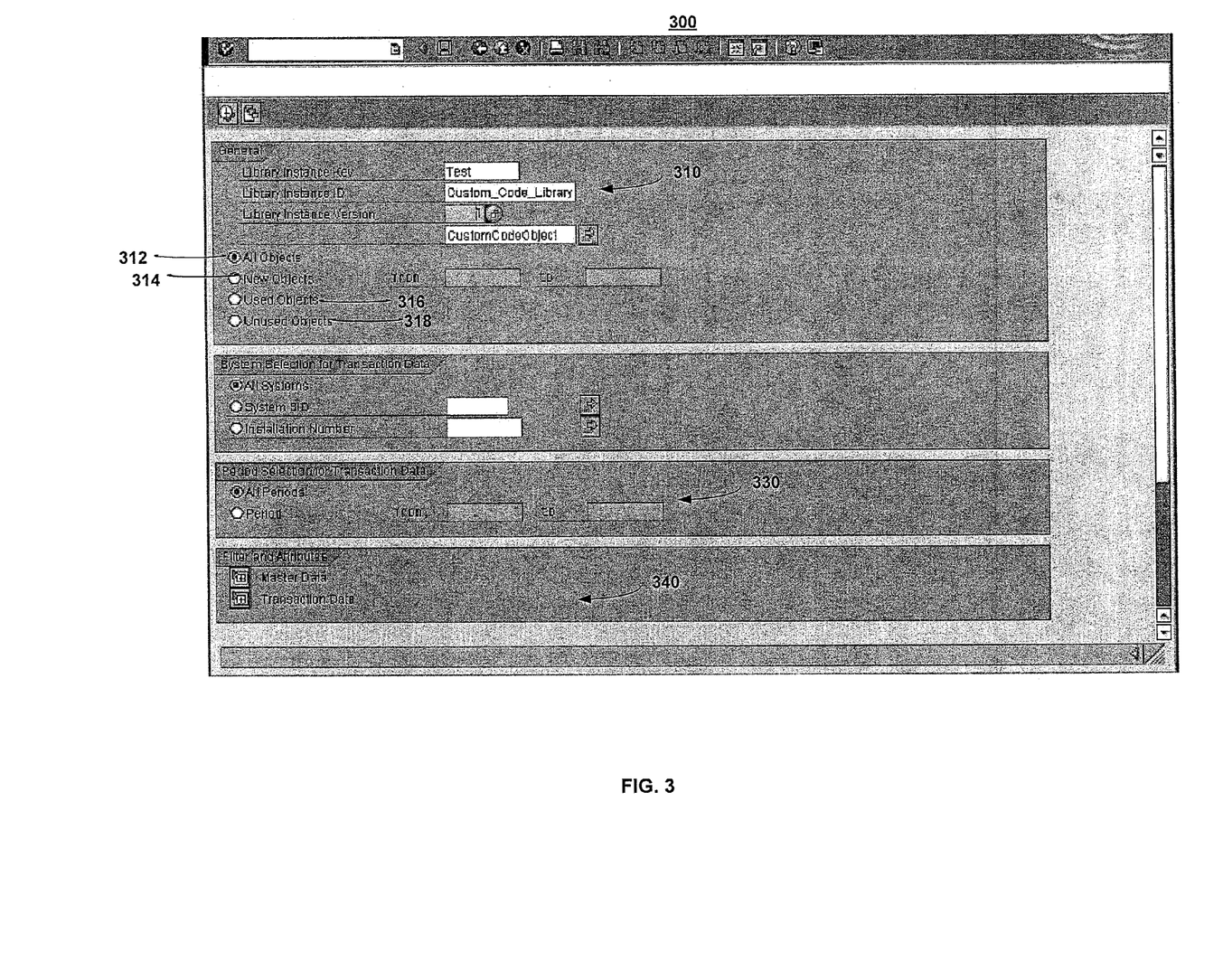
FIG. 3 depicts a page (which may be presented at a user interface) used to provide information to enable a selection of a custom code library.

FIG. 3 depicts a page 300, which may be presented at a user interface. For example, page 300 may be used to provide information to enable a selection of a custom code library, such as custom code library 212, for at least one of the plurality of business system. The selection screen enables picking a business system to be analyzed by system 200. For example, lifecycle manager 210 may manage a plurality of business systems, each including custom code, and one or more of those business systems may have its custom code analyzed by system 200. The user interface 290 may present page 300, so that a user may provide selection information at 310 for a library, such as custom code library 212. Page 300 may include values for a key, an identifier, and a version to identify a code library to be analyzed. This information may be used by lifecycle manager 210 to select which of the plurality of business system to analyze and which corresponding custom code library to access. Page 300 may also be used to enable selection of all objects 312 (e.g., all software objects including code at custom code library 212) from custom code library 212, new objects 314 (e.g., all software objects recently added to custom code library 212), used objects 316 (e.g., all software objects in use at a business system), and unused object 318 (e.g., all software objects not in use at a business system). Page 300 may also allow the selection of a period 330 for transaction data representative of usage or quality. For example, some custom code objects may execute during the closing of a financial period, in which case period 330 may be used to make the selection of that code. Page 300 may also allow the selection of a filters and attributes 340 for defined attributes, such as a source system, an object type, a development class, customer defined attributes (e.g., lifecycle status), distribution rule, owner and/or under contract.

The values of page 300 may be used to form a query of the custom code library 212. For example, when new object 314 is entered at 300, reporter 214 may form a query of metadata stored in custom code library 212 as a database, and the query may obtain all new objects (or all new custom code objects depending on the selected time period) in custom code library 212. The metadata for system 200 (which may be stored at custom code library 212) may include metadata describing source system, object type (e.g., program, function, table, enhancement object, and the like), development class, software component, and the metadata may be obtained via a function call or any other mechanism. In response to the query by reporter 214, the returned values from the custom code library 212 may include metadata describing the objects including custom code objects as well as other information used to determine key performance indicators for custom code.

Figure 4:
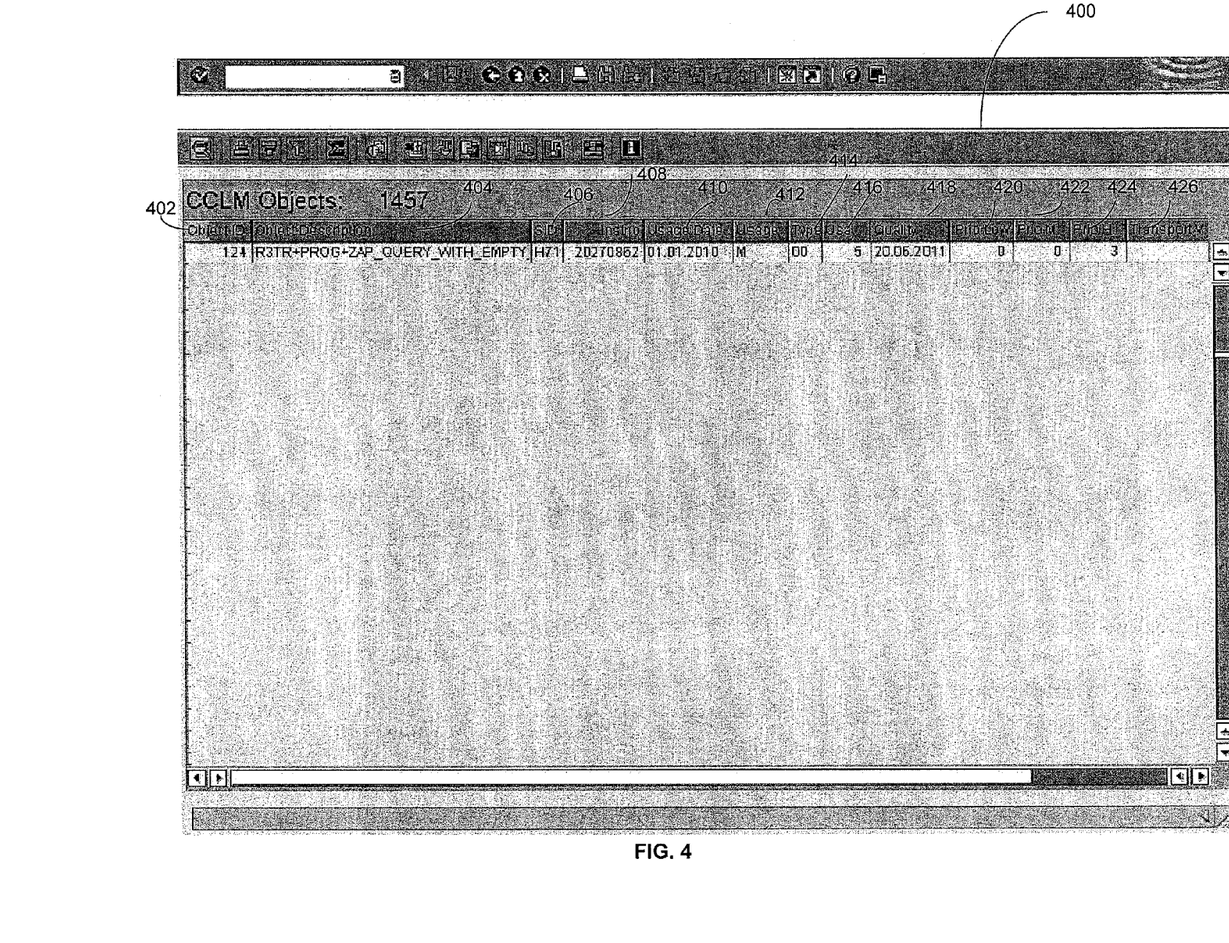
FIG. 4 depicts a page (which may be presented at a user interface) including metadata stored at custom code library.

FIG. 4 depicts a page 400 including metadata which may be stored at custom code library 212 and reported by reporter 214. Referring to FIG. 4, page 400 may include an identifier for the object 402 (e.g., an identifier of a custom code object), a technical description of the object 404, a system identifier 406 identifying the business system where the object is implemented, an installation number as system identifier 408 (e.g., 406 and 408 may be used to uniquely identify the business system), a field 410 for indicating usage date for the code, a type field 414, a usage 416 for number of executions on the business system identified by 406 and 408, a date field for quality data collection 418, an indication of a low 420, medium 422, or high 424 for indicating priority of quality messages, and a transport value 426 for indicating where an object was transported (e.g., sent) from a development systems. Although FIG. 4 depicts specific examples of metadata, other types of metadata may be used as well.

The score calculator 216 may determine a code score (also referred to herein as a custom code score and/or a score) based on the metadata obtained by the reporter 214 (e.g., page 400) and the rules template 217. For example, the metadata may be used to determine whether a custom code has an owner (e.g., the owner, licensee and the like of the code is known), a quantity of custom code objects, a quantity of new custom code objects, a severity level for a quantity of enhancements/modifications, a quality (e.g., a quantity of quality or error messages), version inconsistencies across connected productive business systems, and usage information for the productive business systems. These and other metadata may be used with the rules template to calculate the score.

In some implementations, the score calculator 216 may utilize the rules template 217 configured as an XML-based rules template, although the rules template 217 may be configured in other formats as well. The rules template 217 may include one or more names of the key performance indicators used to determine the quality of the custom code and thus a score. The rules template 217 may also include one or more rules to obtain data from custom code library (e.g., database select statement(s) to query for the metadata related to the custom code). The rules template 217 may also include one or more functions for calculating the custom code score. For example, the rules template 217 may include equations, scaling factors, thresholds, and the like to apply to the metadata including key performance indicators to determine a custom code score.

Figure 5:
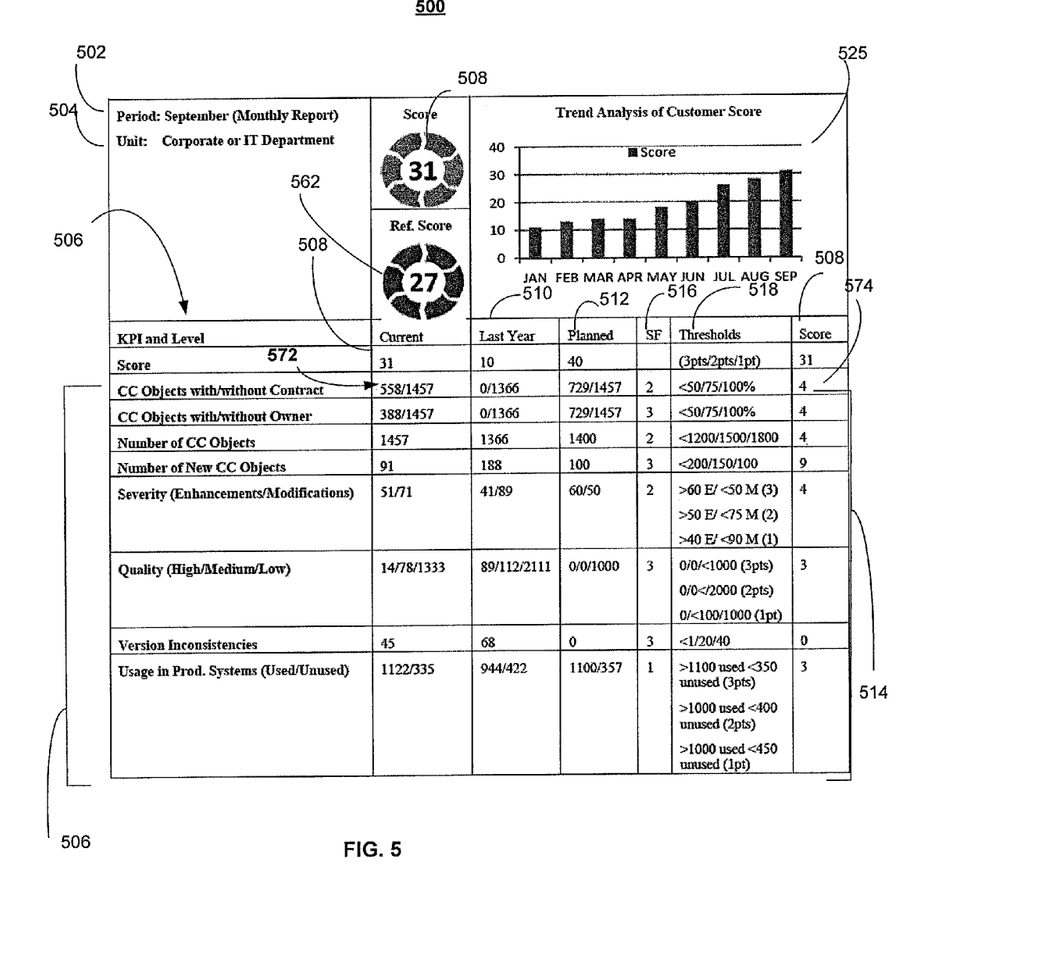
FIG. 5 depicts an example of a page (which may be presented at a user interface) including exemplary code scores.

FIG. 5 depicts an example of a page 500 including custom code scores. The page 500 includes a period 502 over which the current score 508 is calculated, an identity 504 of the business, and key performance indicators 506 (obtained based on the metadata stored at custom code library 212). The key performance indicators 506 may be organized into a hierarchy, such as the levels depicted at FIG. 1, although other organizational schemes may be used as well. Page 500 also depicts a reference score 562 indicating a reference or benchmark score. Page 500 may also depict past 510 scores and key performance indicators, target (e.g., planned) scores 512, and key performance indicators. The values at page 500 are merely exemplary as other implementations may be used as well.

Page 500 also provides some insight into how the score 508 is calculated. For example, the score of 31 comprises sub-scores 514 for each of key performance indicators (e.g., 4, 4, 4, 9, 4, 3, 0, and 3). Moreover, for each key performance indicator, page 500 also depicts scaling factors 516 representative of the weight (or relative importance) of the key performance indicator and thresholds 518 for the key performance indicators.

At 572, an example sub-score of 558 represents the quantity of custom code (CC) objects with a contract already assigned (based on metadata from custom code library 212), with a target of 729 CC objects, with contracts assigned (column Planned-512). In this example, more than 75% of the custom code objects have been assigned a contract and are thus maintained by the lifecycle maintenance program (or contract) of the business system. And, this 75% value maps to a value of 2, which is multiplied by a scaling factor of 2 points to yield a sub-score of 4 574. The function used to map the value of 558 into 2 points. The first two rows (e.g., "CC Objects with/without Contracts" and "CC Objects with/without Owner") represent the control and ownership level at 104 of FIG. 1. The other six rows representing the transparency and awareness level 102 in FIG. 1, bit these rows are merely examples.

The scaling factor 516 may be used to weigh (or prioritize) among the key performance indicators, so that key performance indicators deemed more relevant to lifecycle management are weighted more heavily. In the example of page 500, not having a contract owner, new objects, quality, and version inconsistencies are weighted higher than the others (e.g., with a "3"). The scores may be tracked over time and trending analysis may be plotted 525. Page 500 may be presented at user interface 290 and/of sent to another system via 222.

Figure 6:
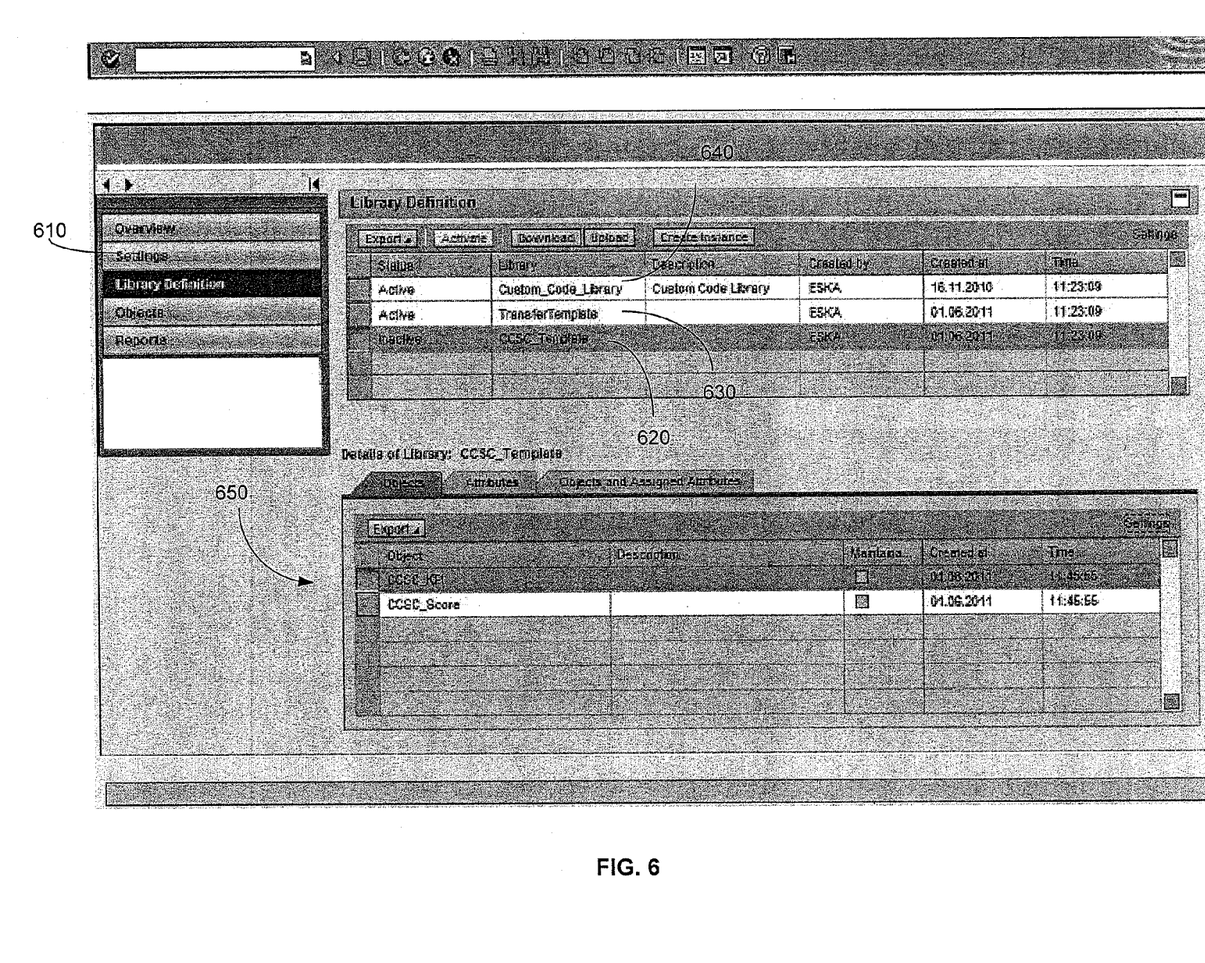
FIG. 6 depicts a page which may be presented at a user interface) where the rules template may be activated for use during score calculation.

FIG. 6 depicts a page 600 where the rules template 217 may be activated for use during score calculation. For example, the library definition view 610 may be used to activate 620 (e.g., CCSC_Template) a rules template, such as rules template 217, and assign it to a certain custom code library 640 (e.g., custom code library 212). The library definition view 610 may be used to activate a transfer template 630, which would be used to convert any results for printing or transferring results to a software vendor (e.g., in order to obtain reference or benchmark scores).

Figure 7:
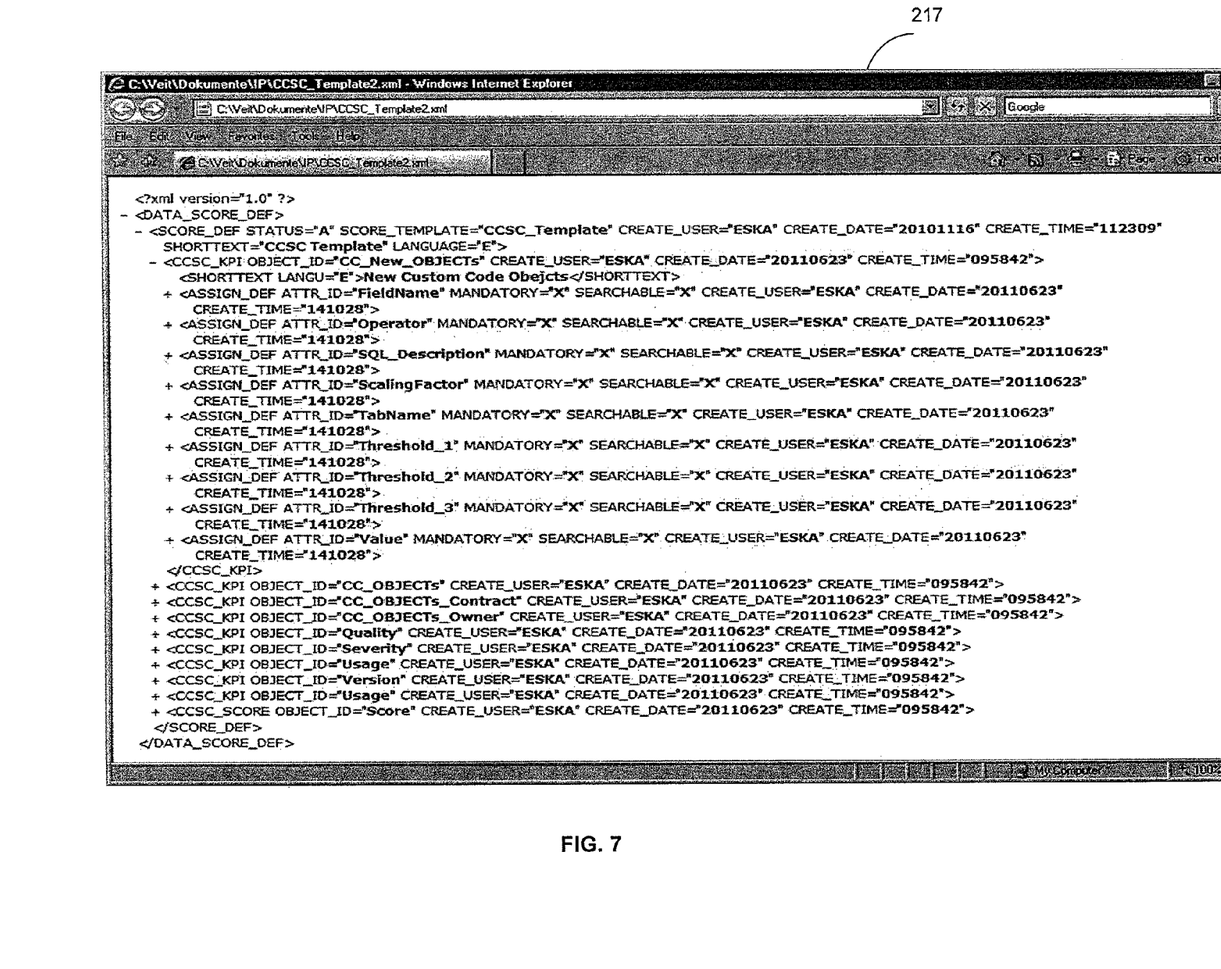
FIG. 7 depicts an example of a rules template.

FIG. 7 depicts an example of the rules template 217, which would be executed by the score calculator 217 to determine a custom code score. The rules template 217 may include a definition of the custom code score. For example, the definition of the custom code score may include one or more of the following: a function defining the calculation of the score, thresholds, scaling factors, table and field names, and information describing how to collect the metadata (e.g., commands such as SQL statements on the relevant tables of the custom code library).

Figure 8:
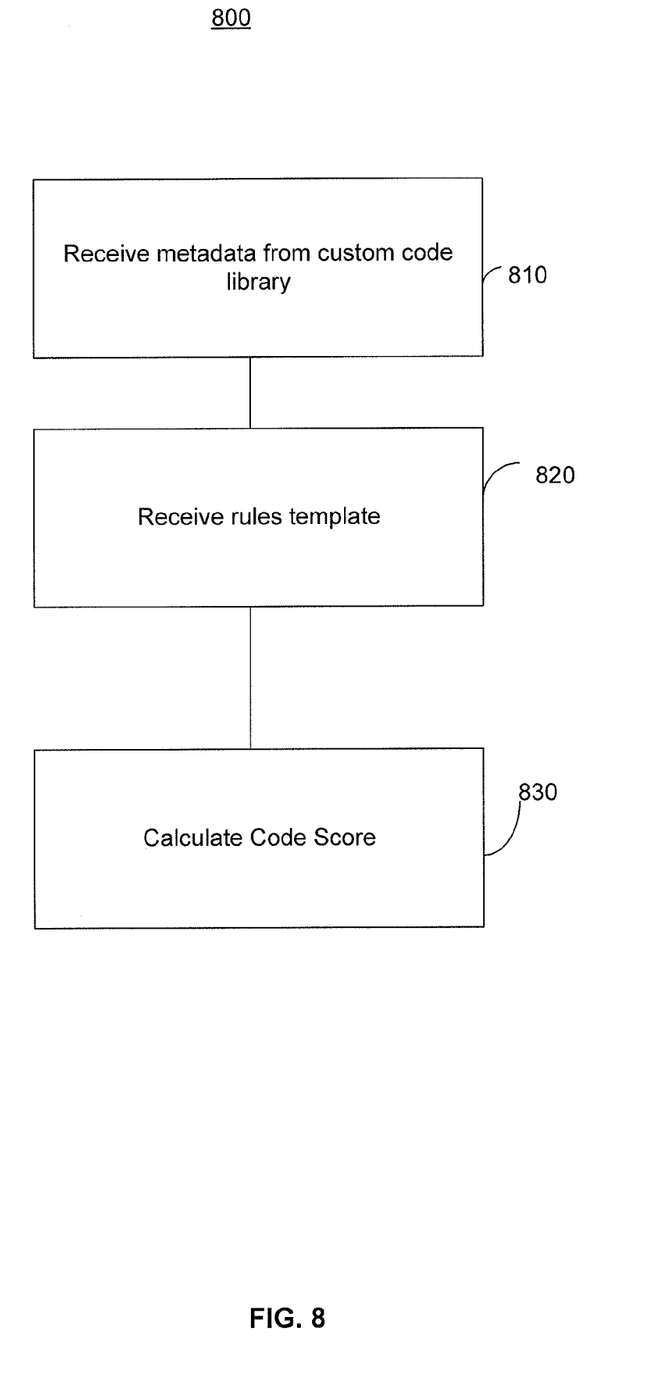
FIG. 8 depicts an example of a process for custom code scoring.

FIG. 8 depicts a process for determining a code score. The description of FIG. 8 also refers to FIGS. 1, 2, and 4.

At 810, the score calculator receives metadata from the custom code library. For example, score calculator 216 may receive metadata describing custom code associated with a business system being analyzed. The metadata may include key performance information and other information, such as the hierarchal information noted above. In some implementations, the metadata is received from the reporter 214, which queries the custom code library 212 for the metadata. Examples of metadata are depicted at FIG. 4, although other types of metadata may be used as well.

At 820, a rules template may be received. For example, score calculator 216 may receive one or more rules from rules template 217. The rules from the rules template 217 may define how to process (e.g., quantify, combine, weight, scale, calculate, and the like) the metadata (or key performance indicators) into a custom code score. For example, the rules may define how to determine a sub-score based on a metadata value and a scaling factor, and the sub-scores may be combined to form the custom code score.

At 830, the custom code score may be calculated. For example, the score calculator 216 may generate a score based on the metadata received at 810 and the rules received at 820. Moreover, the score calculator 216 may determine the code score such that it indicates how well the custom code is incorporated into the lifecycle maintenance program of the business system being managed. The custom code score may be provided as a numerical score, an alphanumeric score, a binary score indicating the degree of incorporation into the lifecycle maintenance program custom code, and the like.

Figure 9A:
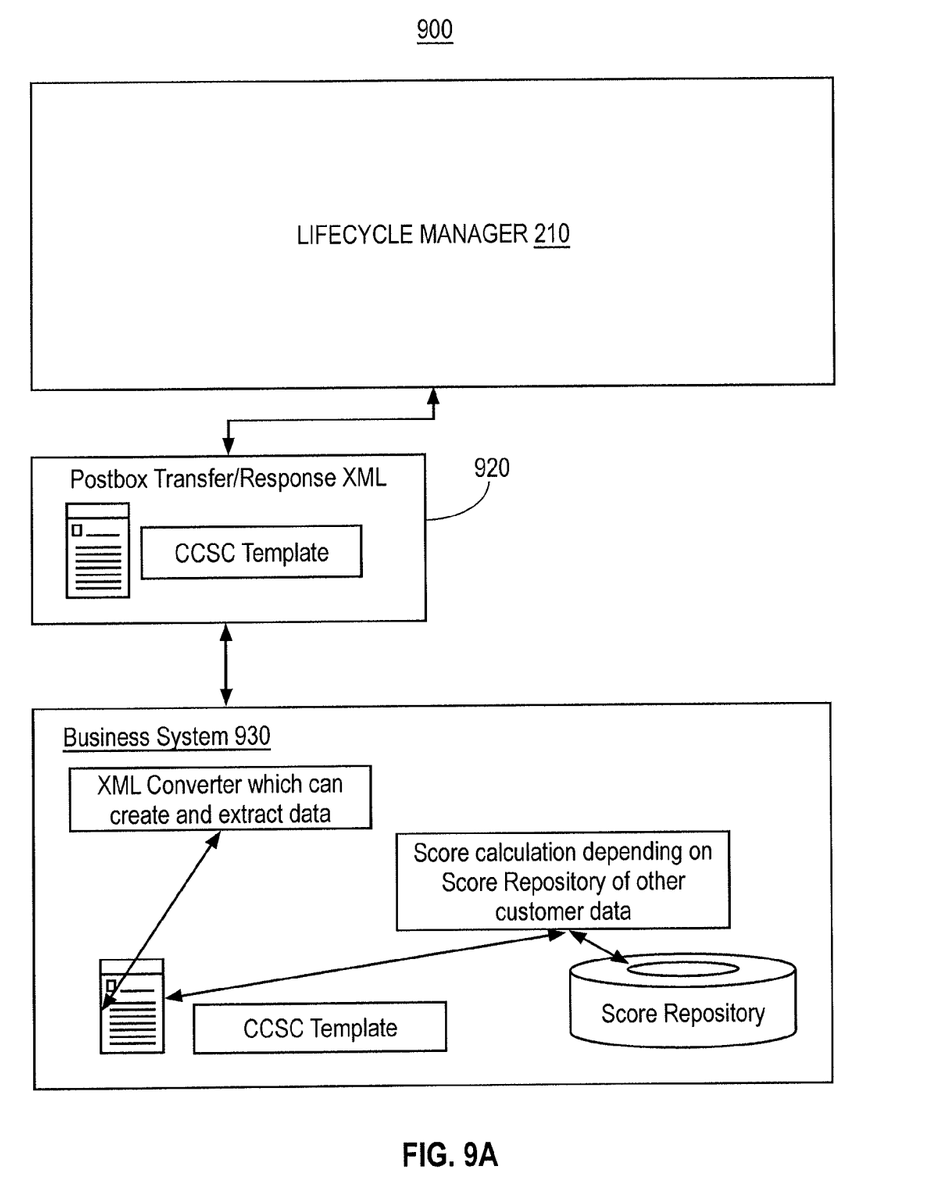
FIG. 9A depicts another example system for custom code scoring.
Figure 9B:
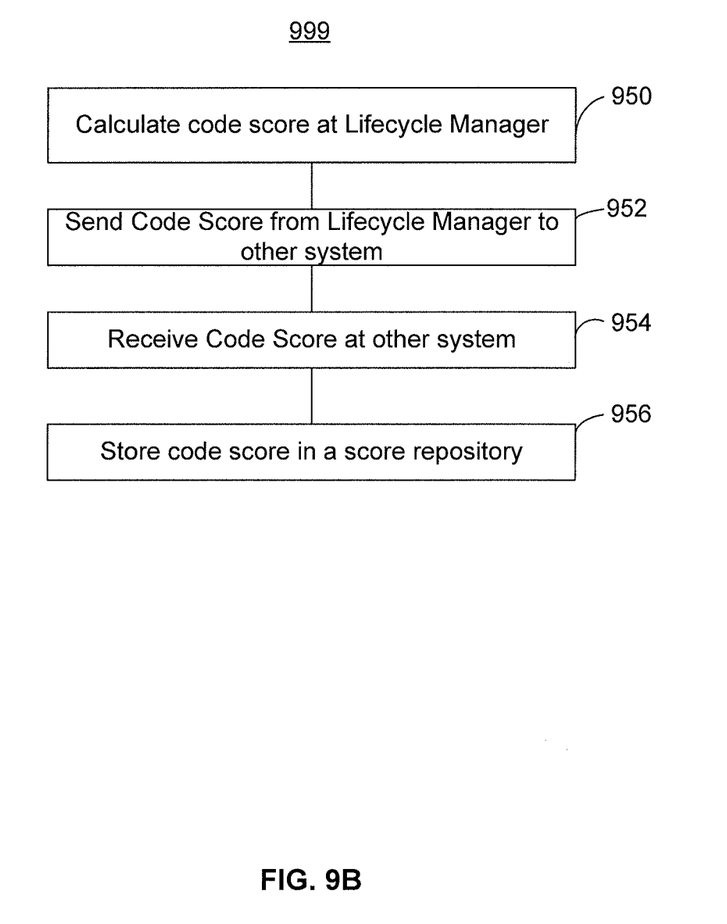
FIG. 9B depicts another example process for custom code scoring.

FIG. 9A depicts system 900 including lifecycle manager 210, a communication interface 920 for exchanging the scores and other information with a business system 930. FIG. 9B depicts an example process 999 for calculating the code score in connection with system 900. At 950, a code score is calculated by the lifestyle manager 210. At 952, the calculated score may then be converted into an XML file at converter 210 and then sent to the other system 930 via a communication interface 920 (e.g., as a message and the like). At 954, the score is then received at business system 930 (e.g., as a message), and then stored, at 956, in a score repository for additional analysis and historical information.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions. As used user herein, module may refer to at least one of a computer program or a portion thereof stored in at least one memory and executed by at least one processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

Although a few variations have been described in detail above, other modifications are possible. For example, while the descriptions of specific implementations of the current subject matter discuss analytic applications, the current subject matter is applicable to other types of software and data services access as well. Moreover, although the above description refers to specific products, other products may be used as well. In addition, the logic flows depicted in the accompanying figures and described herein do not require the particular order shown, or sequential order, to achieve desirable results. Other embodiments may be within the scope of the following claims.

What is claimed:

1. A non-transitory computer-readable medium containing instructions to configure at least one processor to perform operations comprising:
   receiving metadata including information representative of at least one custom code module used in a business system;
   receiving at least one rule from a rules template; and
   calculating, based on at least the received metadata and the received at least one rule, a first score and a second score, wherein when the first score is representative of the at least one custom code module lacking a first owner and the second score is representative of the at least one custom code module having a second owner, the second score indicates a greater degree of maintenance than the first score, wherein the maintenance represents a degree of integration of the at least one custom code module into a lifecycle maintenance program of the business system.

2. The non-transitory computer-readable medium of claim 1, wherein the receiving metadata further comprises:
   querying, by a reporter module coupled to a score calculator module, a custom code library to obtain the metadata describing the at least one custom code module.

3. The non-transitory computer-readable medium of claim 2, wherein the calculating is performed by the score calculator module.

4. The non-transitory computer-readable medium of claim 1, wherein the receiving metadata further comprises:
 querying a custom code library to obtain the metadata including information representative of a location of the at least one custom code module, an ownership of the at least one custom code module in the business system, and integration information for the at least one custom code module.

5. The non-transitory computer-readable medium of claim 1, wherein the at least one rule defines a function for determining at least one of the first score or the second score based on the received metadata.

6. The non-transitory computer-readable medium of claim 1, further comprising:
 providing, by a score calculator module to a user interface, the calculated first and second scores.

7. The non-transitory computer-readable medium of claim 1, further comprising:
 generating, by a score calculator module, a page including the calculated first and second scores.

8. A system comprising:
 at least one processor; and
 at least one memory, wherein the at least one processor and the at least one memory are configured to provide operations comprising:
 receiving metadata including information representative of at least one custom code module used in a business system;
 receiving at least one rule from a rules template; and
 calculating, based on at least the received metadata and the received at least one rule, a first score and a second score, wherein when the first score is representative of the at least one custom code module lacking a first owner and the second score is representative of the at least one custom code module having a second owner, the second score indicates a greater degree of maintenance than the first score, wherein the maintenance represents a degree of integration of the at least one custom code module into a lifecycle maintenance program of the business system.

9. The system of claim 8, wherein the receiving metadata further comprises:
 querying, by a reporter module coupled to a score calculator module, a custom code library to obtain the metadata describing the at least one custom code module.

10. The system of claim 9, wherein the calculating is performed by the score calculator module.

11. The system of claim 8, wherein the receiving metadata further comprises:
 querying a custom code library to obtain the metadata including information representative of a location of the at least one custom code module, an ownership of the at least one custom code module in the business system, and integration information for the at least one custom code module.

12. The system of claim 8, wherein the at least one rule defines a function for determining at least one of the first score or the second score based on the received metadata.

13. The system of claim 8, further comprising:
 providing, by a score calculator module to a user interface, the calculated first and second scores.

14. A method comprising:
 receiving, at a reporter module, metadata including information representative of at least one custom code module used in a business system;
 receiving, at a score calculator module coupled to the reporter module, at least one rule from a rules template; and
 calculating at the score calculator module, based on at least the received metadata and the received at least one rule, a first score and a second score, wherein when the first score is representative of the at least one custom code module lacking a first owner and the second score is representative of the at least one custom code module having a second owner, the second score indicates a greater degree of maintenance than the first score, wherein the maintenance represents a degree of integration of the at least one custom code module into a lifecycle maintenance program of the business system, and
 wherein the reporter module and the score module are implemented on at least one processor.

15. The method of claim 14, wherein the receiving metadata further comprises:
 querying, by the reporter module coupled to the score calculator module, a custom code library to obtain the metadata describing the at least one custom code module.

16. The method of claim 14, wherein the receiving metadata further comprises:
 querying a custom code library to obtain the metadata including information representative of a location of the at least one custom code module, an ownership of the at least one custom code module in the business system, and integration information for the at least one custom code module.

\* \* \* \* \*